US00RE36152E

United States Patent [19]

Hosseini et al.

[11] E Patent Number: Re. 36,152

[45] Reissued Date of Patent: Mar. 16, 1999

[54] METHOD AND APPARATUS FOR CONTROLLING DIFFERENTIALLY DRIVEN WHEEL-SLIP FOR AN ARTICULATED MACHINE

[75] Inventors: Javad Hosseini, Edelstein; Michael A. Cobo, St. Charles; Noel J. Rytter, Peoria; Andrew G. Verheyen, East Peoria, all of Ill.

[73] Assignee: Caterpillar Inc., Peoria, Ill.

[21] Appl. No.: 732,798

[22] Filed: Jan. 22, 1997

Related U.S. Patent Documents

Reissue of:

[64] Patent No.: 5,535,124
Issued: Jul. 9, 1996
Appl. No.: 164,675
Filed: Dec. 9, 1993

U.S. Applications:

[63] Continuation-in-part of Ser. No. 915,996, Sep. 18, 1992, abandoned, which is a continuation-in-part of Ser. No. 829,005, Oct. 4, 1991, abandoned.

[51] Int. Cl.[6] ..... B60K 28/16; B60T 8/32; B60T 8/62

[52] U.S. Cl. ..... 701/82; 701/50; 180/197; 180/235; 180/244; 280/400

[58] Field of Search ..... 364/426.01, 426.027, 364/426.028, 424.07; 303/139, 145, 163, 167, 169; 180/197, 233, 235, 244; 280/400, 432; 701/70, 82, 83, 50

[56] References Cited

U.S. PATENT DOCUMENTS

| | | | |
|---|---|---|---|
| 4,042,059 | 8/1977 | Bertolasi | 180/103 R |
| 4,066,300 | 1/1978 | Devline | 303/96 |
| 4,156,547 | 5/1979 | Marsh | 303/96 |
| 4,344,139 | 8/1982 | Miller et al. | 364/426 |
| 4,349,233 | 9/1982 | Bullard et al. | 303/96 |
| 4,361,871 | 11/1982 | Miller et al. | 364/426 |
| 4,402,377 | 9/1983 | Brooks et al. | 180/197 |
| 4,518,053 | 5/1985 | Queveau | 180/14.2 |
| 4,521,856 | 6/1985 | Phelps et al. | 364/426 |
| 4,745,552 | 5/1988 | Phelps et al. | 364/426.03 |
| 4,884,650 | 12/1989 | Fujiki et al. | 180/197 |
| 4,967,869 | 11/1990 | Nagaoka et al. | 180/244 |
| 5,029,947 | 7/1991 | Knight et al. | 303/7 |
| 5,033,798 | 7/1991 | Breen | 303/7 |
| 5,050,937 | 9/1991 | Eccleston | 303/7 |

FOREIGN PATENT DOCUMENTS

| | | |
|---|---|---|
| WO81/03151 | 11/1981 | WIPO . |
| WO85/05083 | 11/1985 | WIPO . |
| WO87/05870 | 10/1987 | WIPO . |
| WO91/09765 | 7/1991 | WIPO . |

*Primary Examiner*—Michael Zanelli
*Attorney, Agent, or Firm*—David M. Masterson; Byron G. Buck

[57] ABSTRACT

An anti-spin apparatus for a machine is disclosed. The machine is articulated and has at least one axle set with at least two driven wheels. The anti-spin apparatus includes braking mechanisms which controllably apply braking forces to each of the driven wheels. A controller produces a slip signal having a value responsive to the difference in rotational velocity between the wheels of the axle set. A transducer produces an articulation signal having a value responsive to the angle of articulation of the machine. Further, a microprocessor receives the slip signal and the articulation signal, and produces a braking control signal. One of the braking mechanisms receives the braking control signal and responsively applies the braking forces to the faster rotating wheel.

42 Claims, 10 Drawing Sheets

METHOD AND APPARATUS FOR CONTROLLING DIFFERENTIALLY DRIVEN WHEEL-SLIP FOR AN ARTICULATED MACHINE

Matter enclosed in heavy brackets [ ] appears in the original patent but forms no part of this reissue specification; matter printed in italics indicates the additions made by reissue.

This is a Continuation-in-Part of a prior filed patent application Ser. No. 07/915,996 (now abandoned) (filed via PCT/US 92/07975 on Sep. 18, 1992), which in turn was a Continuation-in-Part of patent application Ser. No. 07/829,005 (now abandoned) (filed via PCT/US 91/07312 on Oct. 4, 1991).

TECHNICAL FIELD

This invention relates generally to wheel-slip control systems for machines having differentially driven wheels, and more particularly, to an apparatus and method for controlling wheel-slip for articulated machines in which slip is controlled by application of a braking force to the slipping wheel.

BACKGROUND ART

Machines used in construction sites and other off-road locations generally experience loss of traction. Moreover, four wheel drive machines used in these locations also experience traction loss. For example, slipping occurs to either the front wheels or rear wheels, or to all four wheels.

For example, a machine typically used on construction sites is a wheel loader. Wheel loaders commonly have four driven wheels and are often articulated. As is well known, an articulated machine includes front and rear body parts hinged together by an articulation/joint for relative movement about a [horizontal] *vertical* axis. Each body part includes a wheel set. When one of the body parts move relative to the other the machine turns. During normal operation a wheel loader will experience wheel-slip to all four wheels, especially when loading.

To alleviate such problems, various mechanical anti-spin methods have been developed and placed in commercial use. Such methods have been proven to have various problems, especially during cornering of a machine. For example, one method to prevent front or rear wheel-slip is by locking the differentials. However, since the differential operation is restrained, cornering ability is greatly deteriorated.

An alternative approach involves the provision of separately actuatable drive wheel brakes. An operator selectively applies a braking force to the spinning or slipping wheel, and effects a balancing of power through the differential mechanism. The application of the braking force to the slipping wheel simulates increased traction and results in a more even distribution of power between the differentially driven wheels. This approach is commonly used on farm machines.

However, one problem not addressed in preventing wheel-slip is accounting for the articulation angle (the angle representing the relative movement of one body part to the other). The relative movement of one body part to the other provides for machine cornering. When cornering the rotational velocities between the machine's radially inner and outer wheels are different; consequently, the radially outer wheels have a faster rotational velocity than the radially inner wheels.

Some methods fail to accommodate the normal wheel speed differential which arises during the machine cornering. For example, when the machine is cornering such methods may brake the faster rotating wheel (radially outer wheel) causing excessive tire wear due to the radially outer wheel or wheels dragging.

Other methods may drive only the slower wheel in a turn, making the machine hard to steer and applying excessive torque to the wheel being driven, often causing failure of the final drive.

The present invention is directed to overcoming one or more of the problems as set forth above.

DISCLOSURE OF THE INVENTION

In one aspect of the present invention, an anti-spin apparatus for a machine is disclosed. The machine is articulated and has at least one axle set with at least two driven wheels. The anti-spin apparatus includes braking mechanisms which controllably apply braking forces to each of the driven wheels. A controller produces a slip signal having a value responsive to the difference in rotational velocity between the wheels of the axle set. A transducer produces an articulation signal having a value responsive to the angle of articulation of the machine. A microprocessor receives the slip signal and the articulation signal, and responsively produces a braking control signal. Finally, one of the braking mechanisms receives the braking control signal and responsively applies the braking forces to the faster rotating wheel.

BRIEF DESCRIPTION OF THE DRAWINGS

For a better understanding of the present invention, reference may be made to the accompanying drawings in which.

BEST MODE FOR CARRYING OUT THE INVENTION

Figure 1:
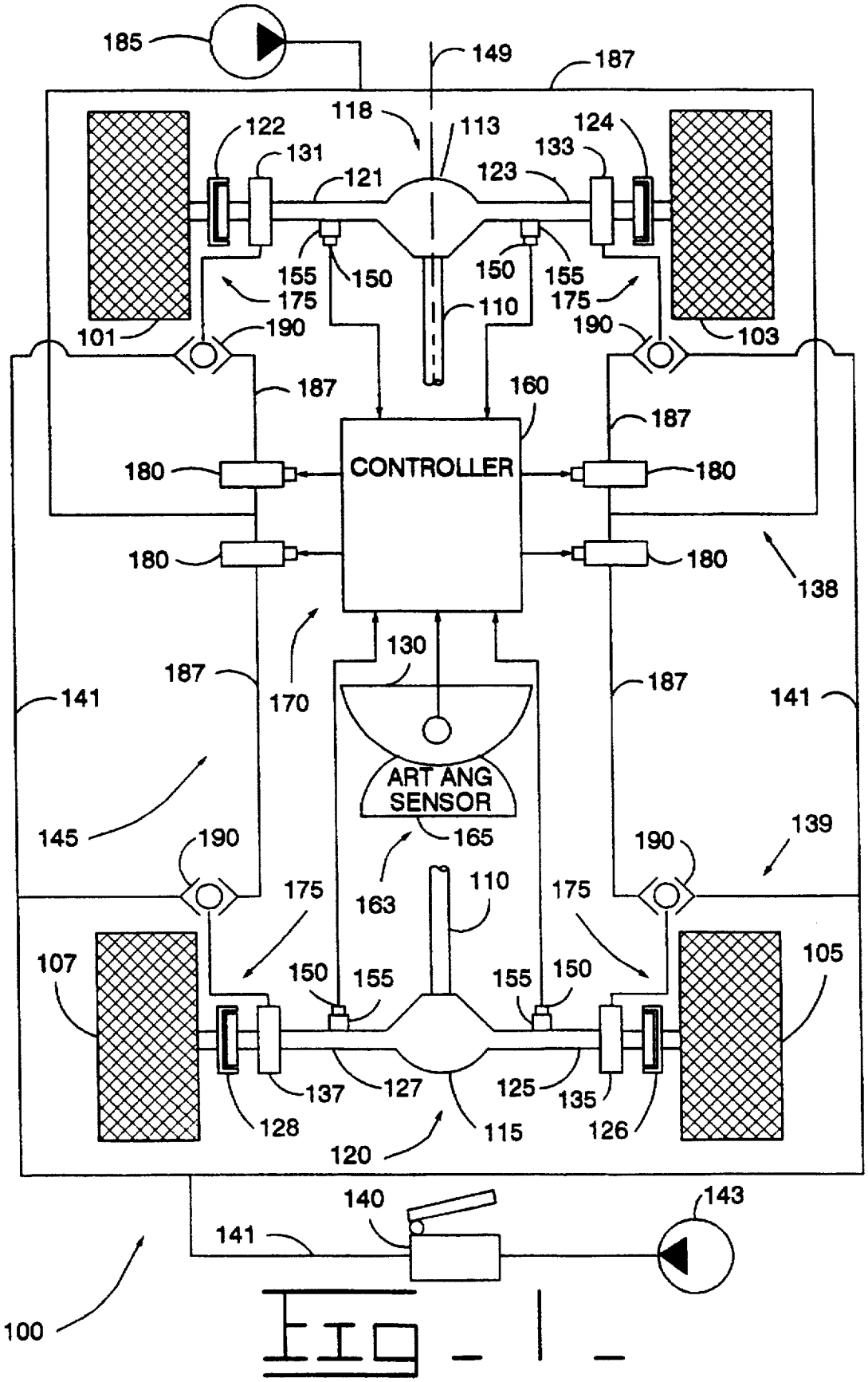
FIG. 1 is a diagram of a machine drive system including an anti-spin apparatus in accordance with the present invention.

Referring first to FIG. 1, an anti-spin apparatus 100 embodying certain principles of the present invention is illustrated. Wheels 101,103,105,107 are driven by an engine (not shown) through an input or drive shaft 110, respective differential mechanisms 113,115 and respective axle sets 118,120 which include half-axles 121,123,125,127 and final drive assemblies 122,124,126,128, respectively. The axle sets 118,120 also include braking mechanisms 131,133,135,137 connected between the respective differentials and final drive assemblies. The axle set may have "inboard" or "outboard" brake and final drive assemblies. For example and as shown in FIG. 1, the outboard assembly includes the braking mechanism and the final drive assembly in close proximity to the wheel with the half-axle connected between the differential and the braking mechanism. Alternatively, the inboard assembly (not shown) includes the braking mechanism and final drive in close proximity to the differential with the half-axle connected between the final drive and the wheel. The drive systems disclosed are conventional and no further details need be disclosed for an understanding of the present invention.

The machine is articulated and includes front and rear wheeled sections 138,139 hinged together by an articulation joint or mechanism 130 for relative movement about [an horizontal] *a vertical* axis 149, thus enabling the machine to be steered.

The wheels 101,103,105,107 are stopped by hydraulically engaged service brake pistons, of braking mechanisms 131, 133,135,137 connected between the respective differentials and final drive assemblies. The brakes may be spring-biased in the engaged position and maintained in the disengaged position by application of fluid pressure. Alternatively, the brakes may also be maintained in the engaged position by the application of fluid pressure and spring-biased in the disengaged position. The method of engaging the brakes will vary from machine to machine and is not critical to the present invention. The service brakes are normally actuated by a brake pedal 140 via a service brake line 141 connected to the service brake and retarder master cylinders (not shown). The fluid is pressurized and is supplied by the service pump 143. The service brake system is well known and does not form a part of this invention.

Means 145 produces a slip signal having a value responsive to the difference in rotational velocity between the wheels of each axle set. As shown and in the case of the outboard axle design, the slip signal producing means 145 includes a wheel speed pickup in the form of a Hall effect device 150 which provides pulses in cooperation with a gear-like device 155. The device 155 is mounted on each axle portion 121,123,125,127. Alternately, in the case of the inboard axle design (not shown), the transducer 150 is mounted on the braking mechanism and the device 155 is machined into the circumference of a brake disk and rotates therewith. In either case, the signals from the transducer 150 are applied to one input of an electronic controller 160, the details of which are described below.

Each transducer 150 produces respective signals having values responsive to the rotational speed or velocity of the wheels 101,103,105,107. All the wheel speed signals for each wheel 101,103,105,107 are provided in a similar manner. Moreover, the wheel speed signals for each wheel are applied to an input of the electronic controller 160. For example, each transducer 150 is preferably a Hall effect device. The transducer 150 produces a pulse-type, time variable output voltage. Such transducers are well known in the art. However, other transducers, such as optical and electromagnetic devices, may be employed as alternatives.

Means 163 produces an articulation signal having a value responsive lo the angle of articulation of the machine. Means 163 preferably includes a potentiometer 165 controllably connected to the articulation mechanism 130. The output of the potentiometer 165 is a signal that is pulse width modulated in response to the position of the articulation mechanism 130. For example, the potentiometer 165 is adapted to measure 100 radial degrees. Other suitable angular position transducers may be substituted for the potentiometer 165 in the means 163, as is well known in the art.

The electronic controller 160 is part of a control means 170 which receives the slip signal and the articulation signal. The control means 170 controllably modifies the slip signal in response to the value of the articulation signal, and produces a braking control signal. A braking means 175 controllably applies braking forces to each of the driven wheels 101,103,105,107. More particularly, the braking means 175 receives the braking control signal and controllably operates the braking mechanisms 131,133,135,137 in response to the received braking control signal.

The controller 160 operates upon the signal inputs, determines the existence, magnitude, and location of wheel-slip during a loss of traction situation, and distinguishes between true wheel-slip and a transducer failure. In response to detecting a true slip condition, the power transfer between two differentially driven wheels is balanced by applying a proportional braking force to the wheel which loses traction, i.e. the faster rotating wheel. This is accomplished with the braking means 175, and more particularly, the selection of electrohydraulic control valves 180.

The electrohydraulic control valves 180 operate in combination with a supply pump 185, which may be part of the service pump 143. The supply pump 185 supplies pressurized oil or brake fluid. Fluid lines 187 from the pump 185 run through the hydraulic valves 180 and check valves 190 directing pressure to one of the braking mechanisms 131, 133,135,137 under modulated or proportionally controlled pressure. The check valves 190 are ball-type check valves and the electrohydraulic brake valves are solenoid operated three-way valves; both types of valves are well known in the art and will not be further discussed.

Figure 2:
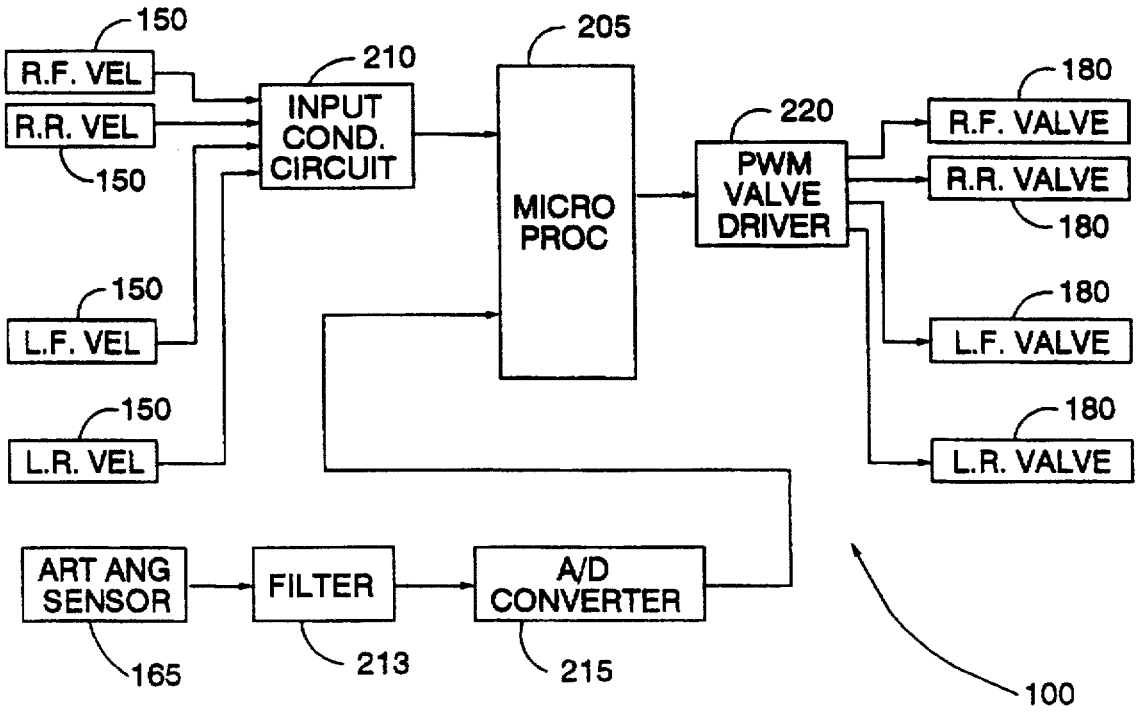
FIG. 2 is a block diagram of the electronic circuitry associated with the present invention.

FIG. 2 is a block diagram of the anti-spin apparatus 100 described above. A microprocessor 205 performs system control functions. The microprocessor 205 is supplied by Motorola as Part No. 68HC11, for example. However another microprocessor such as Motorola's No. 6809, may be substituted as one skilled in the art can readily appreciate. Transducers 150 which supply the wheel speed signals are connected to the microprocessor 205 through an input conditioning circuit 210. The input circuit 210 provides appropriately digitized input signals to the microprocessor 205. The articulation angle sensor 165 is connected to a low pass filter 213 through an A/D converter 215 to the microprocessor 205.

A first output of the microprocessor 205 is connected through a pulse-width modulated servo valve driver 220 associated with each electrohydraulic control valve 180. The pulse-width modulated servo valve drivers 220 receive the braking control signal produced by the microprocessor 205 and proportionally controls the respective electrohydraulic valves 180 in response to the braking control signal. The duty cycle of the braking control signal varies in response to the slip signal. Advantageously, the applied braking forces are modulated in response to the modulation or duty cycle of the braking control signal. For example, the microprocessor 205 controls the energization of the electrohydraulic brake valves 180 via the braking control signal providing pressurized fluid to the respective service brakes.

Figure 3:
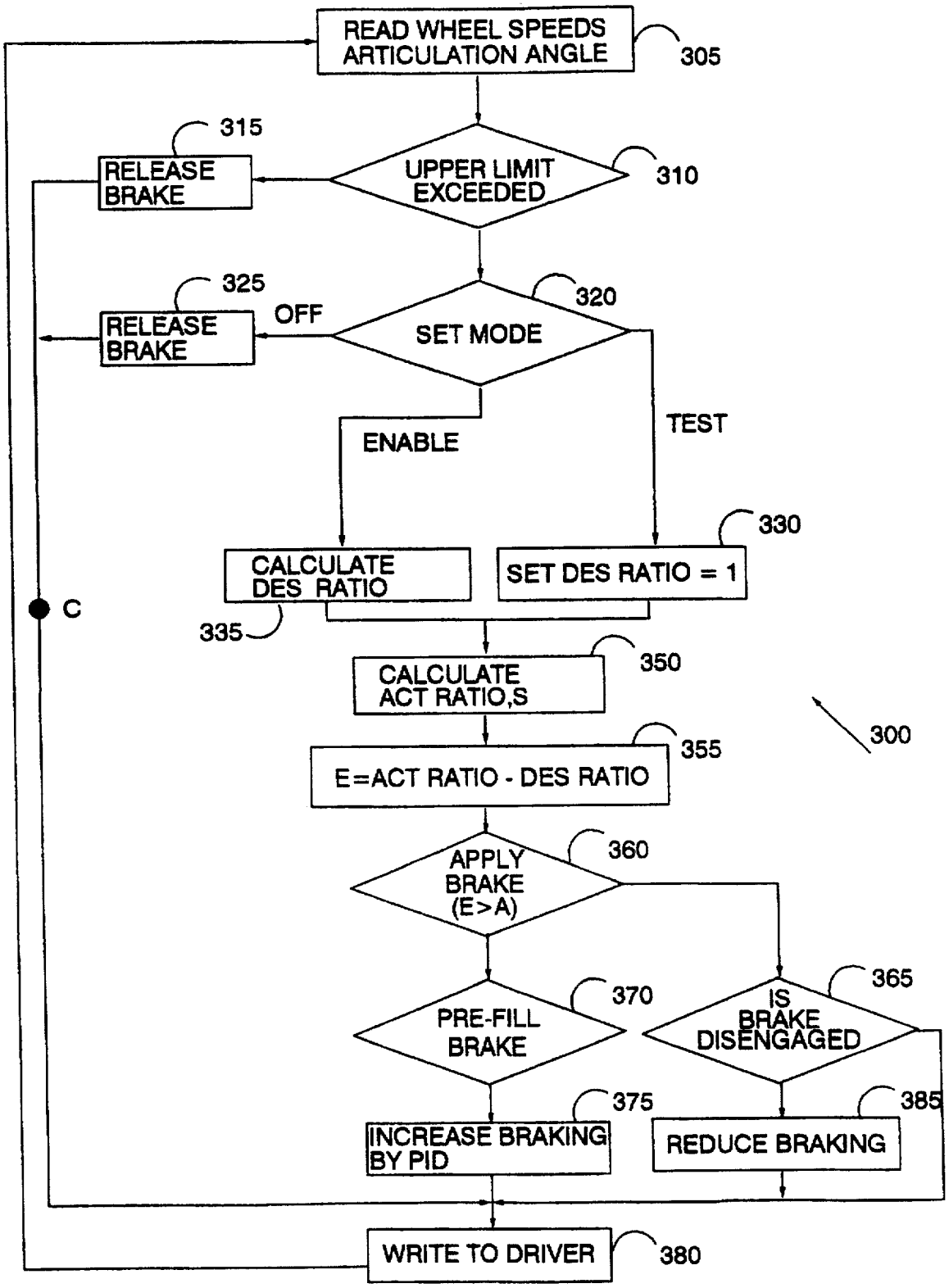
FIG. 3 is a top level flowchart of one embodiment of an anti-spin control associated with the present invention.

FIG. 3 depicts a flowchart illustrating a computer software program for implementing a preferred embodiment of the present invention. The flowchart of FIG. 3, generally shown at 300, illustrates the manner in which the present invention controls the wheel-slip of the machine. Here, it is noted that the front and rear wheel sets are controlled independent to one another. Thus, FIG. 3 represents the control of one wheel set—the other wheel set will have an identical flow chart.

For the purposes of following discussion, the term "inner wheel" represents the inside turning wheel and "outer wheel" represents the outside turning wheel. If the machine is not turning, then the inner wheel represents the left wheel, while the outer wheel represents the right wheel.

Control begins with reference to block 305 where the individual wheel speeds and machine articulation angle are sampled. As apparent from the flowchart, the wheel speeds and machine articulation angle are sampled on each control loop. As described below, the control is continually adjusting the braking forces in response to the changing machine parameters. After the machine parameters have been sampled, the control passes to block 310 to determine if the wheel speeds are beyond an upper limit established for the wheel-slip control. The upper limit is exceeded when one of the wheels is traveling greater than a maximum velocity value, 10 km/hr, for example. The upper limit represents the maximum machine speed in second gear. If the upper limit is exceeded then the control proceeds to block 315 where the inner and outer brakes are released.

Block 320 is provided for the machine operator to set the mode of operation of the wheel-slip control. A three position switch, for example, may be used to set the desired mode. A first position, representing an "off" mode, requires that control pass to block 325 to release the brakes.

A second position, representing a "test" mode, requires that a desired speed ratio of "1" be set, as shown in block 330. A desired speed ratio of "1" represents that the inner and outer wheels are rotating at the same speed. The test mode allows the operator to observe the machine braking, while the operator controls the machine articulation. For example, when the machine is articulating, the outer wheel rotates faster than the inner wheel. Consequently, the actual speed ratio is different than the desired speed ratio and the brakes are applied to the outer wheel to reduce the error between the desired and actual speed ratio. The function of the test mode will become more apparent from a further reading of the disclosure.

Figure 4:
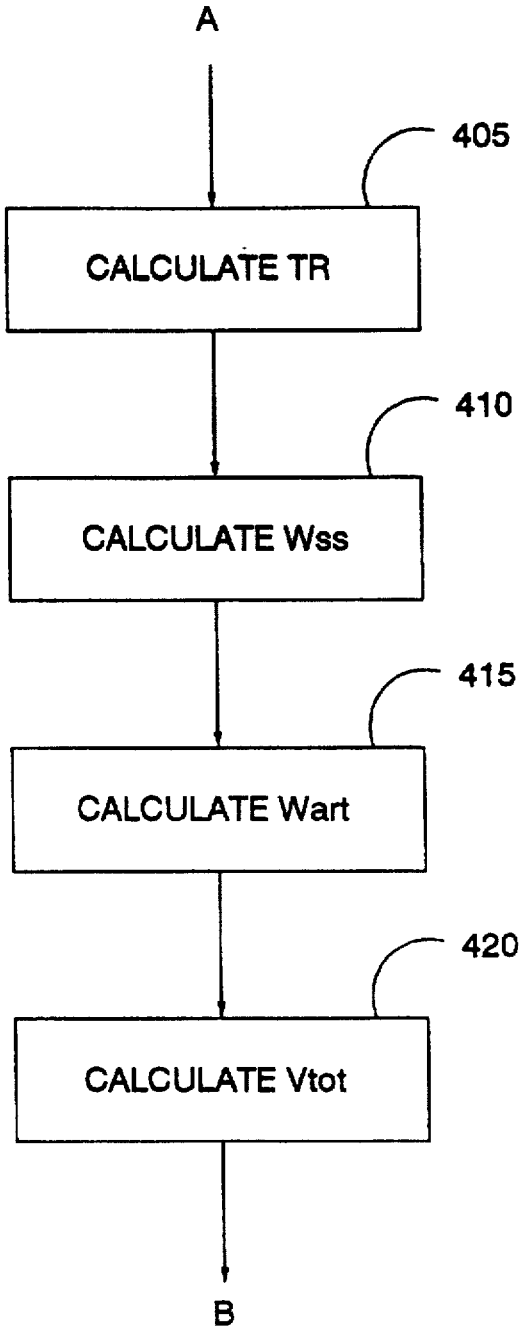
FIG. 4 is a second level flowchart of an embodiment that calculates current operating conditions associated with the one embodiment of the present invention.
Figure 5:
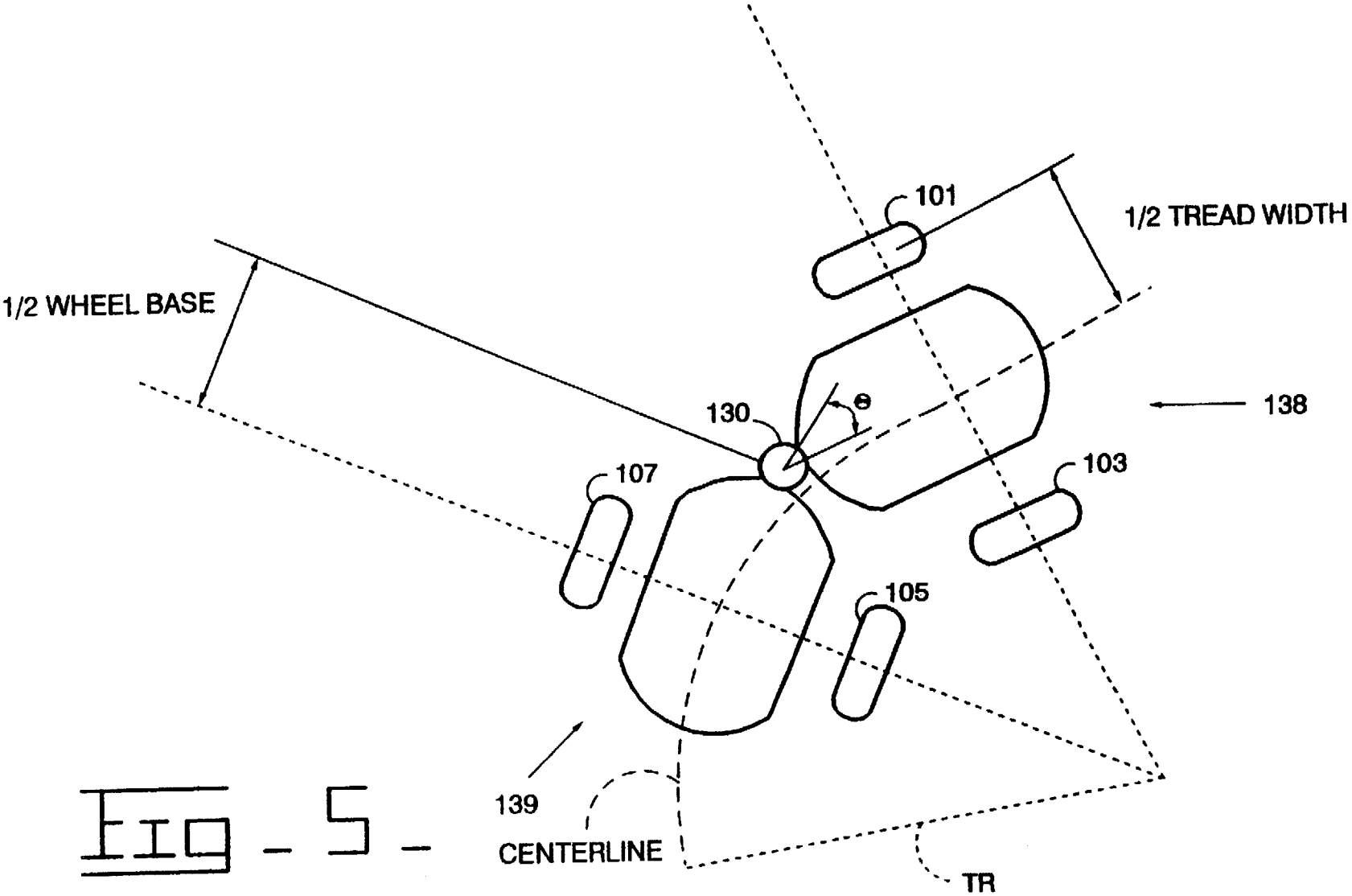
FIG. 5 is a block diagram of the machine illustrating certain machine nomenclature.

Assuming now that the switch is set to a third position, representing an "enable" mode, control then passes to block 335 where the desired speed ratio is calculated. The desired speed ratio represents an ideal speed differential between the outer and inner wheels. However, before the desired speed ratio is calculated, several machine parameters should be calculated. Reference is now made to FIG. 4, which shows a flowchart for calculating the machine parameters. FIG. 5 is also provided for the readers convenience. For example, FIG. 5 is a simplified diagram that shows many of the machine parameters.

Referring now to block 405 of FIG. 4, the machine turning radius, TR, is calculated according the following relationship:

$$TR = \tfrac{1}{2}\,(WHEELBASE/\tan(\theta/2))$$

Next, at block 410, the steady state angular velocity of the machine, $\omega_{ss}$ is calculated according to the following relationship:

$$\omega_{ss} VM/TR$$

where, VM (machine speed)=

$$(\Sigma \text{ individual wheel speeds}/2)*(\text{rolling radius of the wheels})$$

Once $\omega_{ss}$ is calculated, control then passes to block 415 where the articulation rate, $\omega_{ART}$, is calculated according to:

$$\omega_{ART} = d\theta/dt$$

The control then calculates the overall wheel velocity of each wheel, $V_{TOT}$, at block 420. First, the wheel velocity due to a steady state articulation condition, $V_{SS}$, is calculated according to:

For the left front wheel, $$V_{SSLF} = VM - \omega_{ss} * \tfrac{1}{2}\ \text{TREAD WIDTH}$$

For the left rear wheel, $$V_{SSLR} = V_{SSLF}$$

For the right front wheel, $$V_{SSRF} = VM + \omega_{ss} * \tfrac{1}{2}\ \text{TREAD WIDTH}$$

For the right rear wheel, $$V_{SSRR} = V_{SSRF}$$

Second, the wheel velocities due to a transient articulation condition, $V_{ART}$, is calculated according to:

For the right front wheel, $$V_{ARTRF} = (\omega_{ART} * \tfrac{1}{4}\ \text{TREAD WIDTH})$$

For the left front wheel, $$V_{ARTLF} = -V_{ARTRF}$$

For the right rear wheel, $$V_{ARTRR} = -V_{ARTRF}$$

For the left rear wheel, $$V_{ARTLR} = V_{ARTRF}$$

Finally, the overall wheel velocities are calculated according to the following relationship:

For the left front wheel, $$V_{TOTLF} = V_{SSLF} + V_{ARTLF}$$

For the right front wheel.

$$V_{TOTRF} = V_{SSRF} + V_{ARTRF}$$

For the left rear wheel, $$V_{TOTLR}=V_{SSLR}+V_{ARTLR}$$

For the right rear wheel, $$V_{TOTRR}=V_{SSRR}+V_{ARTRR}$$

Figure 6:
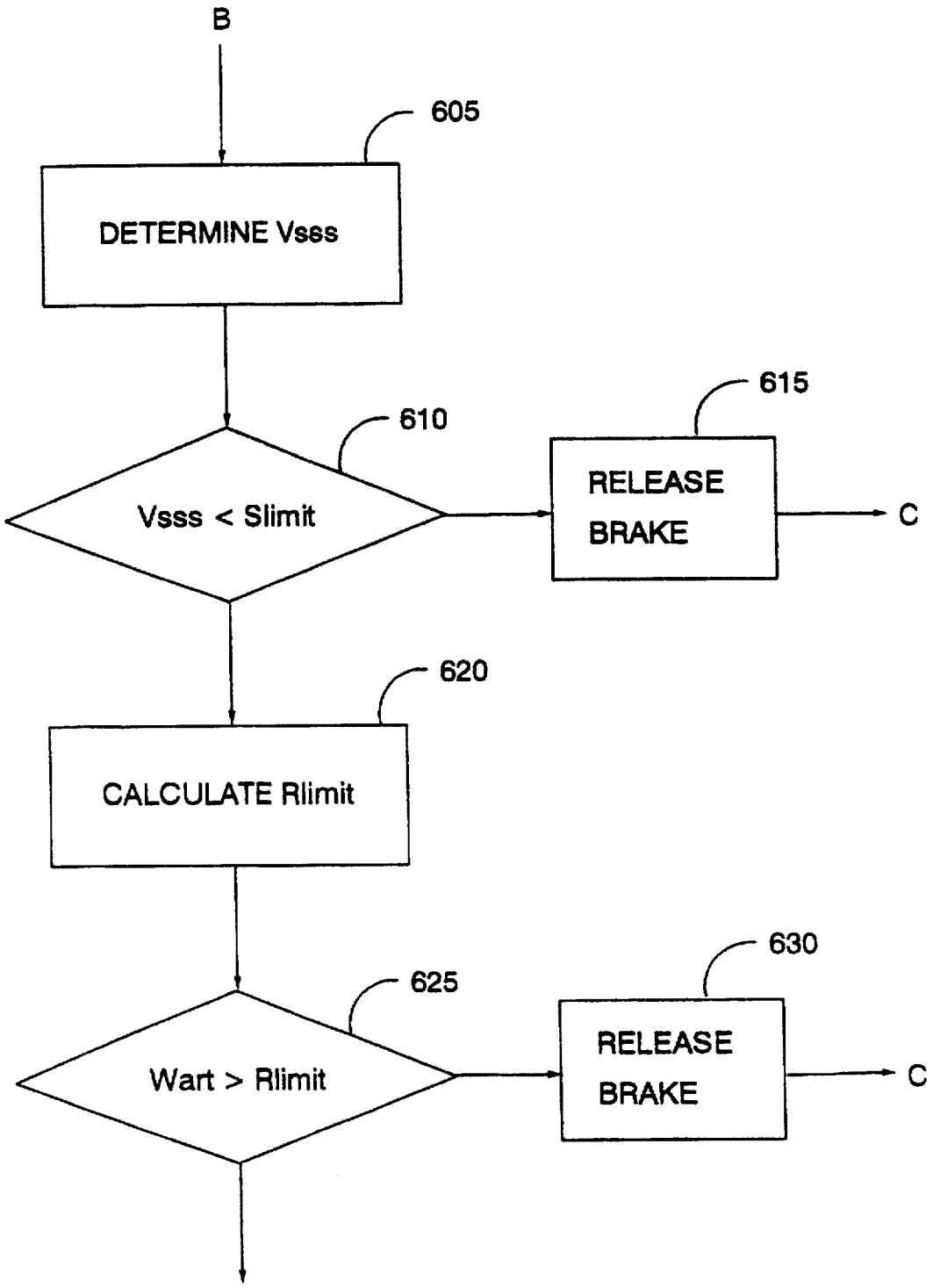
FIG. 6 is a second level flowchart of an embodiment that determines the working range of the one embodiment of the present invention.

Once the machine parameters are calculated, the control transfers to point "B" of FIG. 6, where the machine parameters are compared to the working range of the wheel slip control. Here, the control determines if the wheel speeds are below a lower limit or if the machine articulation rate is beyond an upper limit. This step may be critical to proper control of the wheel slip. For example, a wheel velocity that is too slow may result in poor wheel speed data due to limitations of the wheel speed sensor. Poor wheel speed data may degrade the performance of the wheel slip control. Further, fast articulation rates may also degrade the performance of the control.

Referring to block 605 of FIG. 6, the smallest steady state wheel velocity, $V_{SSS}$, is determined according to the following logic statement:

if ($V_{SSLF}<V_{SSRF}$) then $$V_{SSS}=V_{SSLF}$$

else $$V_{SSS}=V_{SSRF}$$

Once the smallest steady state wheel velocity, $V_{SSS}$, is determined, the control proceeds to block 610 where, $V_{SSS}$, is compared to the lower limit velocity value, Slimit. Slimit may have a value of 1.5 km/h, for example. If $V_{SSS}$ is found to be less than Slimit, then the control proceeds to block 615 to release the brakes and returns to point "C" of FIG. 3.

Otherwise the control continues to block 620 to calculate the maximum articulation rate, Rlimit, according to the following relationship:

$$\text{Rlimit}=(V_{SSS}-\text{Slimit})/(\tfrac{1}{2}*\text{TREAD WIDTH})*2$$

Once maximum articulation rate is calculated, control then proceeds to block 625 to compares the articulation rate, $\omega_{ART}$, with the limit value, Rlimit. If $\omega_{ART}$ is greater than Rlimit then the control proceeds to block 630 to release the brakes and return to point "C" of FIG. 3. Otherwise, the machine parameters are said to be within the working range of the wheel-slip control. Consequently, the control calculates the desired speed ratio. As stated earlier, the desired speed ratio represents an ideal speed differential between the outer and inner wheels and is responsive to the machine articulation angle. For example, the desired speed ratio is defined as the ratio of the outer wheel speed to the inner wheel speed. As earlier stated, because the wheel-slip control controls the front and rear wheel sets independently, the desired speed ratio for the front and rear wheel sets is calculated separately.

The desired speed ratio calculation is now described. First, the front desired ratio, Fdrat, is calculated according to the following logic statement:

If $V_{TOTLF>VTOTRF}$ then $$\text{Fdrat}=V_{TOTLF}/V_{TOTRF}$$

else $$\text{Fdrat}=V_{TOTRF}/V_{TOTLF}$$

Next, the rear desired ratio, Rdrat, is calculated according to the following logic statement:

If $V_{TOTLR}>V_{TOTRR}$ then $$\text{Fdrat}=V_{TOTLR}/V_{TOTRR}$$

else $$\text{Fdrat}=V_{TOTRR}/V_{TOTLR}$$

Once the desired speed ratios are calculated, control the proceeds back to FIG. 3 at block 350, where the actual speed ratio is calculated. In the preferred embodiment of the present invention, the slip signal is represented by the actual speed ratio. The actual speed ratio includes two values, one value, ACT RATIO, representing the ratio of: the speed of the faster rotating wheel to the speed of the slower rotating wheel. The other value, S, represents the faster rotating wheel, e.g. the inner or outer wheel.

As shown by block 355 an error value, E, is produced. The error value is the difference between the desired speed ratio and the actual speed ratio.

At block 360, the error value, E, is compared to a first predetermined reference value, A. The first predetermined reference value is representative of a predetermined amount of error. If the error value is greater than the first predetermined reference value, control continues to block 370. Otherwise the control proceeds to block 365.

Assuming that the error value is greater than the first predetermined reference value, the braking mechanism obtains a sufficient amount of hydraulic fluid to build the pressure before the brakes are applied. This is accomplished by energizing the respective electrohydraulic valve to fill the associated braking mechanism with pressurized fluid. Filling the braking mechanism substantially removes any time lag between the moment that the braking control signal is issued and the moment in which the brake is applied. Typically, the valve is energized for a time period of 100 m.s. to achieve a desirable fluid pressure. It should be apparent that once braking has initiated there is no need to pre-fill the braking mechanism. Control then continues to block 375 where braking forces are applied to the faster rotating or slipping wheel utilizing PID (Proportional+Integral+Derivative) control.

Figure 7:
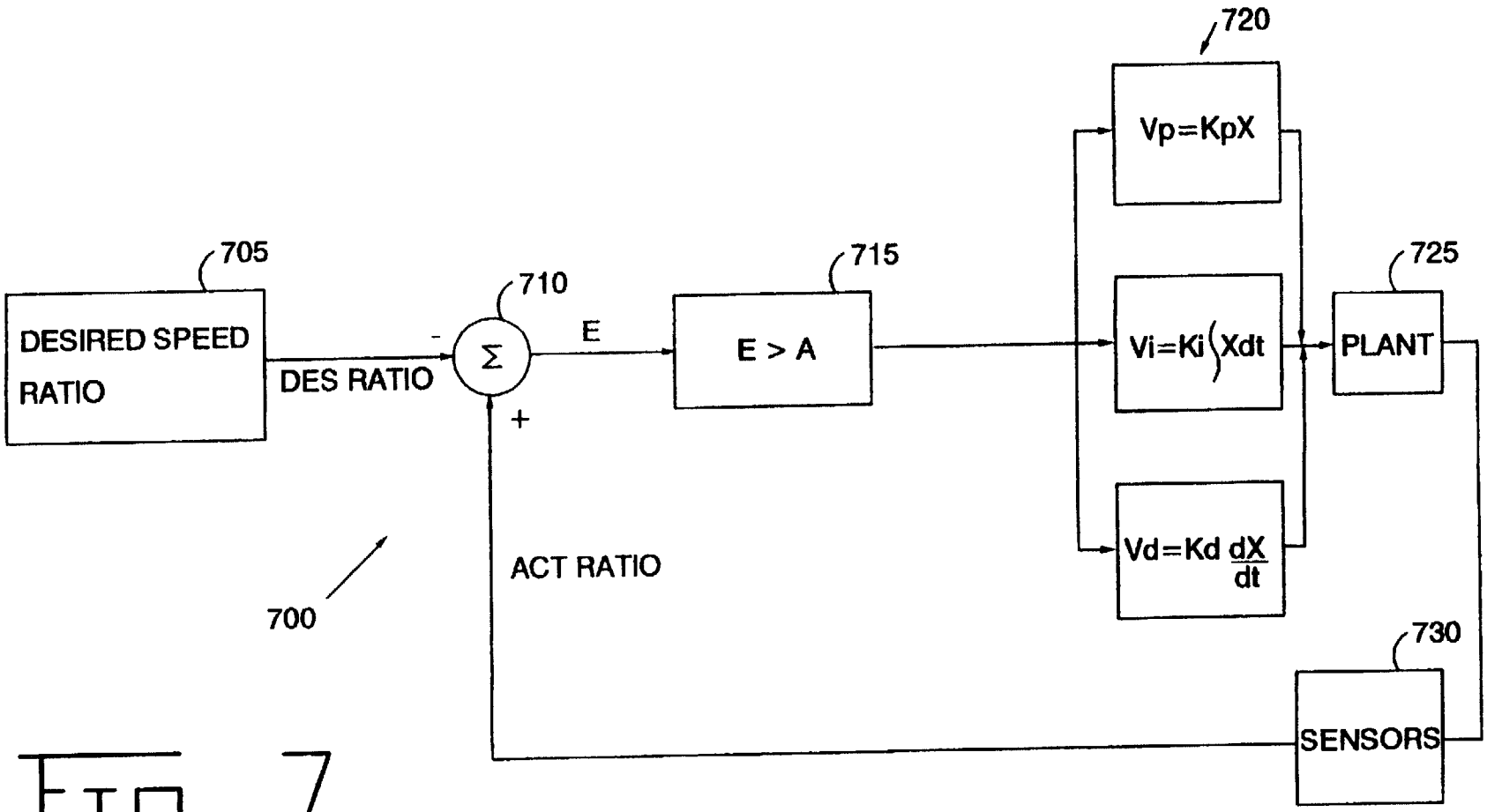
FIG. 7 is a block diagram of an embodiment that utilizes PID feedback control associated with the one embodiment of the present invention.

FIG. 7 shows a block diagram of the PID control. As shown at the summing junction 710, the error value, E, is the difference between the desired speed ratio, drat, and the actual speed ratio, ACT RATIO. Assuming the error value, E, is greater than the first predetermined reference value, A, then the error value is delivered to the PID block 720. The PID block 720 is represented by the equation, $V=V_p+V_i+V_a$. The result, V, is converted to a command signal that is delivered to the electrohydraulic valve to produce the desired result. The values of the constants $K_p$, $K_i$, and $K_d$ are determined from simulation and analysis of empirical data in response to under footing conditions, machine dynamics, type of work performed by the machine, etc. For example, the values of the constants $K_p$, $K_i$, and $K_a$ may be 1.0, 0.5 and 1.0, respectively. It will be readily apparent to those skilled in the art that the PID constant values may be a wide range of numerical values depending on the desired gain of to the feedback system.

In response to the error value, E, the PID control calculates the braking forces necessary to reduce the error to the first predetermined reference value. For example, the PID control produces a command signal, $I_c$, that is representative of the desired braking force to be applied to the slipping wheel.

Additionally, an energy management scheme may be employed. Advantageously, the energy management scheme limits the braking force to reduce the heat generated by the application of the brake. Limiting the braking force reduces brake fatigue, thus extending the lifetime of the brake. The energy management scheme limits the bias ratio to a desired value within a range of 1.2 to 1.8, for example. The bias ratio is defined as: the torque of the non-slipping wheel to the torque of the slipping wheel.

The wheel-slip control determines a management signal, $I_m$, in response to values representing an average wheel speed and a desired bias ratio. The average wheel speed is calculated by the equation:

(inner wheel speed+outer wheel speed)/2

The microprocessor 205 may use a three-dimensional look-up table or the like, provided in RAM to determine the management signal. The look-up table may be produced from values determined from simulation and analysis of empirical data. The microprocessor 205 may then compare the calculated values with those found in the look-up table to arrive at the management signal.

Figure 8:
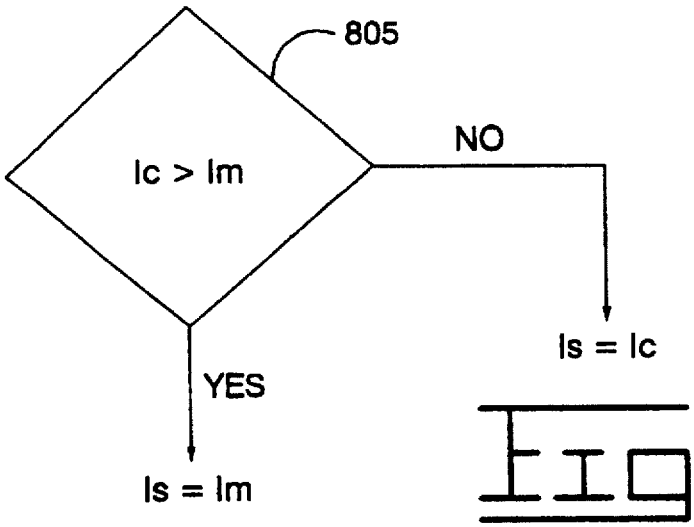
FIG. 8 is a second level flowchart of an energy management scheme associated with the one embodiment of the present invention.

Once the management signal has been determined, the control compares the magnitude of the management signal, $I_m$ to that of the command signal, $I_c$ as shown in FIG. 8 at block 805. If the command signal is greater than the management signal, then the braking control signal, $I_s$, is set to the value of magnitude of the management signal. Otherwise, the braking control signal is set to the value of the command signal. The braking control signal, $I_s$, is written to the respective valve driver to initiate the desired braking force, shown at block 380.

Figure 9:
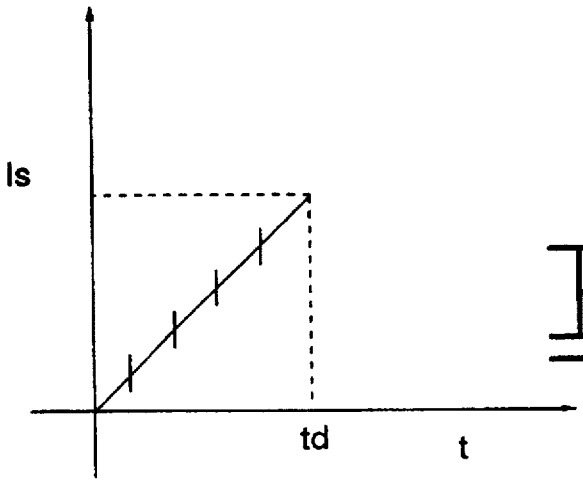
FIG. 9 is a first graphical representation of a braking control signal associated with the one embodiment of the present invention.

FIG. 9 illustrates the magnitude of the braking control signal, $I_s$, with respect to time. The response time, $I_d$, is the time elapsed from a zero braking force to a final braking force. Advantageously, the microprocessor 205 applies the braking force to the faster rotating or slipping wheel in an incremental fashion. This allows for a smooth transition from the initial braking force to the final braking force. For example at each loop of the control, the microprocessor 205 causes the braking force to increase an incremental or calculated amount over the previous value. As previously discussed, the calculated amount is determined by the PID control. The increments are shown by the "hatching" along the curve of FIG. 9. Thus, the microprocessor 205 produces the braking signal, $I_s$, with an increasing magnitude at each loop of the control to regulate the slip of the slipping wheel.

Figure 10:
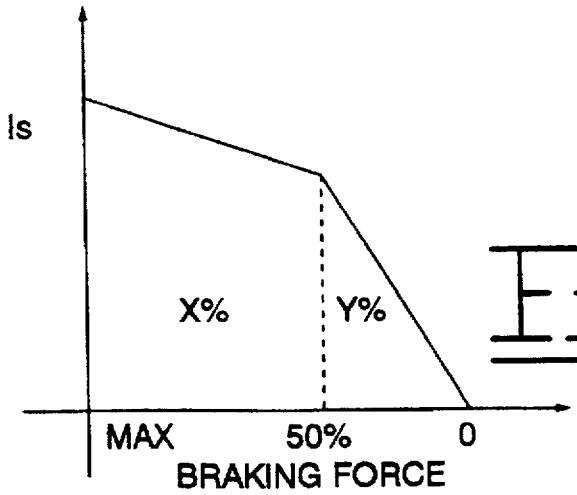
FIG. 10 is a second graphical representation of the braking control signal associated with the one embodiment of the present invention.

Adverting back to FIG. 3 at block 365, it is desired to reduce the amount of braking force to the slipping wheel. First, the control determines if the brake is completely disengaged. If not, control passes to block 385. This block is best shown in relation to FIG. 10. As shown the brake pressure is released in a "two-tier" fashion. At each loop of the control, the microprocessor 205 produces the braking control signal, $I_s$, with decreasing magnitude of a predetermined amount. For example, the braking force is incrementally reduced from the maximum force to 50% maximum force by X% of the previous value. The braking force is then incrementally reduced from 50% maximum force to zero force by Y% of the previous value. For example the values of percent reduction of X and Y may be 4% and 7%, respectively. Afterwhich, control then continues to block 305.

Figure 11:
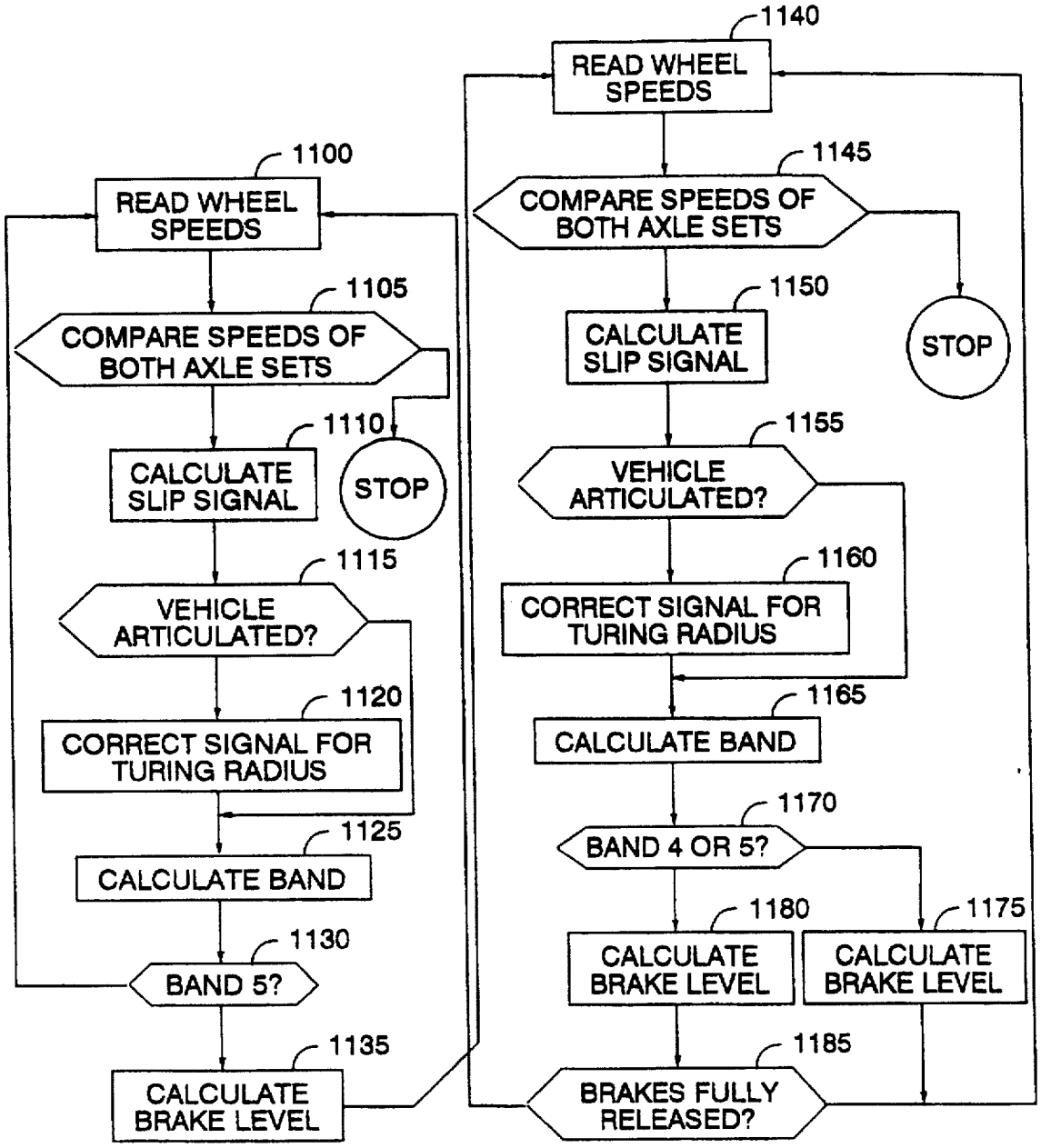
FIG. 11 is a top level flowchart of a second embodiment of the anti-spin control associated with the present invention.

The following discussion refers to another embodiment of the present invention. The flowchart depicted in FIG. 11 illustrates an alternate control for regulating the wheel-slip of the machine. Note that, in discussion relating to FIG. 11, the brakes are assumed to be spring biased; thus, the brake pressure is the inverse of fluid pressure. However, breaking could be easily be implemented in the opposite fashion, increasing brake pressure in direct rather than inverse ratio to the applied fluid pressure.

Referring now to FIG. 11, a functional flow chart defining the internal programming for the microprocessor 205 is shown. Advantageously, the microprocessor 205 is programmed to establish a plurality of slip reference bands, each band having associated therewith an applied brake force value expressed in terms of fluid pressure. From this flow chart, a programmer of ordinary skill can develop a specific set of program instructions for a general purpose microprocessor that defines the necessary slip reference bands, timing cycles, and brake fluid pressure values necessary for implementation of the instant invention.

Data delivered by the transducers 150, indicative of the four wheel speeds, are sampled in block 1100 of FIG. 11. Control then passes to block 1105 where the sum of the half-axle speeds of one axle set 118 is compared to the sum of the half-axle speeds of the other axle set 120. An inequality within a predetermined tolerance range indicates that a sensor or sensor circuit has failed, since both axle sets 118,120 are directly connected via the respective differentials 113,115 to the drive shaft 110. As a matter of convenience and for purposes of this discussion, a differential ratio of 1:1 is assumed throughout. In the case of inequality, the program terminates and, if desired, an indication of the apparent transducer failure can be presented to the operator. Otherwise control then passes to block 1110.

In block 1110, the slip signal is generated from the wheel speed signals produced by the transducers 150. Each axle set 118,120 has a slip signal value. For example, the slip signal is defined as the ratio of the rotational velocity of one wheel to the rotational velocity of the other wheel for each axle set 118,120. The value of the slip signal has one of three possible values; less than 1, 1, and greater than 1. A slip signal value of 1 represents that each wheel associated with a respective axle set is rotating at an identical velocity. A slip signal value not equal to 1 represents that one wheel is rotating faster than the other for a respective axle set. For example, a ratio less than 1 may represent that the left wheel is rotating faster than the right wheel for a respective axle set. Alternatively, a ratio greater than 1 may represent that the right wheel is rotating faster than the left wheel for a respective axle set, for example. Note that the rotational velocity for each wheel of each axle set 118,120 is calculated independently of the other.

Next, control then passes to block 1115 where data produced by the articulation sensor 165 is sampled. If the data delivered by the articulation sensor 165 represents that the vehicle is articulated, then control passes to block 1120, otherwise, control passes to block 1125.

In the block 1120, the slip signal value is modified according to the following formula:

$$z=(0.5/x)*y$$

where x is the maximum amount of articulation for the vehicle, 35° for example, and y is the amount of articulation in degree measure which is represented by the value of the articulation signal. The quantity z is either added or subtracted to the slip signal value. The values shown in this formula are for exemplary purposes only and the values may be readily changed by the artisan depending on the application of the vehicle and the resolution of the articulation sensor 165.

To best illustrate how the slip signal value is modified, the following examples are discussed. Since normal cornering of the vehicle (i.e, an articulation signal not being equal to zero) produces an apparent slip condition, with the radially outer wheels of the vehicle rotating faster than the radially inner wheels, the control means 170 adjusts or modifies the slip signal value to prevent actuation of the anti-slip control in response to maneuvering the vehicle. For example, if the outside rotating wheel is found to rotate faster than the inside rotating wheel for a respective axle set then the microprocessor 205 reduces the slip signal for that axle set by subtracting the quantity, z, from the slip signal value. Alternatively, if the inside wheel is rotating faster than the outside wheel, then the microprocessor 205 increases the slip signal for the respective axle set by adding the quantity, z, to the slip signal value.

TABLE 1

Band 1: 1.0<Slip Signal Value<1.5

Band 2: 1.5<Slip Signal Value<2.0

Band 3: 2.0<Slip Signal Value<2.5

Band 4: 2.5<Slip Signal Value<3.0

Band 5: 3.0<Slip Signal Value

Block 1125 represents a calculation subroutine. Essentially, the control means 170 determines the location of the slip signal value with one of the five bands represented by Table 1. The slip reference bands are contiguous, the upper limit of one band being the lower limit of the next, with the highest band being the first predetermined reference value referred to above. The first predetermined reference value must be exceeded by the slip signal value before anti-spin control begins. The control means 170, and more particularly, the microprocessor 205 makes this determination by comparing the slip signal value with the first predetermined reference value., and with the other reference values shown in Table 1. The values shown in Table 1 are for illustrative purposes only and it is apparent that one skilled in the art may deviate from the values given, based on the application of the vehicle.

Block 1130 determines if the slip signal value is greater than the first predetermined value; signified by band 5, the most severe slip condition band. If so, control then transfers to block 1135, otherwise the control returns to block 1100.

In block 1135, the microprocessor 205 calculates the brake pressure level. Block 1135 increases the wheel brake force by determining the wheel brake hold-off pressure by an increment X, for each timed interval established by the microprocessor 205. Initially, the vehicle can enter the slip control only via band 5. Therefore, the slip signal value must exceed the first predetermined reference value, for example 3.0. Once the slip control has been entered through band 5, control is exited by sequencing through the lower bands 4-1, producing a smooth transition back to the uncontrolled mode.

Assuming that band 5 is entered, the brake force is periodically incremented by reducing the brake pressure by the increment X for every timing cycle, until the slip signal value causes entry into another slip band. This is best seen in FIG. 12, where the first step from the hold off pressure of 2756 KPa represents an abrupt reduction in pressure to 1378 KPa, followed by three additional incremental reductions of approximately 229 KPa each, increasing the brake force through spring action with each incremental step.

Figure 12:
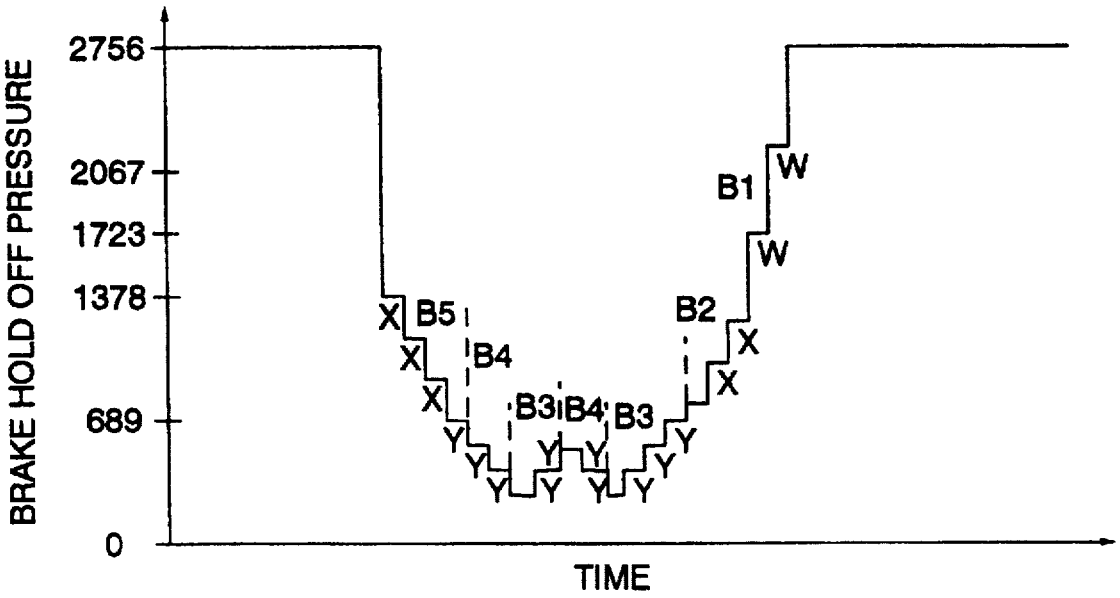
FIG. 12 is a graphical representation utilized in describing the second embodiment of the present invention.

Next, the slip condition in the example represented in FIG. 12 enters band 4, in which the slip has been reduced to the point where the slip signal value is within the range between 2.5 and 3.0. Accordingly, the system approaches the full brake force condition and a gradual curve, but the brake force increments becoming smaller toward the full brake force condition.

As is also represented in FIG. 12, reaching a lower band value and qualifying for successive entry into slip bands 3, 2, 1, causes gradual increasing incremental reductions in brake force until the system is back to an unbrake condition represented by application of the brake fluid pressure of 2756 KPa. Preferably, band 3 is a mirror image of band 4, and causes incremental reductions in braking force through incremental increases in brake fluid pressure. Band 2 is a mirror image of band 5, and causes large incremental reductions in brake force. Band 1 has no counterpart, and causes still larger reductions in brake force as represented by the increment W in the diagram of FIG. 12. The values shown in FIG. 12 are for illustrative purposes only and can be readily changed by one skilled in the art depending upon the vehicle application.

To further illustrate the above description and referring to FIG. 12, control passes to block 1140. Block 1140 is essentially similar to block 1100 where the wheel speed signals are sampled. Additionally, control blocks 1140, 1145, 1150, 1155, 1160, and 1165 are similar to what was earlier presented and the operation of each will not be discussed. However, the essence of blocks 1140–1165 enable the control to periodically query the slip signal and consequently modify the slip signal as needed. To continue the smooth transition from band 5 to the lower bands, the control continues to block 1170 determining if the slip signal value corresponds to either band 4 or band 5. If so, control passes to block 1175 where the microprocessor 205 calculates the brake level corresponding to FIG. 12, otherwise, control passes to block 1180. In block 1180 the brake level is calculated for either bands 2 or bands 3, and consequently, the brake force pressure is increased. Block 1185 determines if the brakes are fully released or if the pressure is 2756 KPa.

From the foregoing it is apparent that the anti-spin apparatus operates to detect a slipping wheel, apply braking force to the slipping wheel, and periodically and incrementally modulate the braking force either positively or negatively in accordance with the degree of slip which is detected by the system. Conditions giving rise to a slip signal value of 3.0 or less do not cause entry into the slip control mode, because the first predetermined reference value is not exceeded. This prevents unintentional operation of the slip control.

It will be evident to those skilled in the art to delay certain portions of the control within the control algorithm disclosed in FIG. 11. For example, a delay may filter out short term wheel slip aberrations. However, this is not critical to the present invention.

It is noted that values described herein are for exemplary purposes only. It will be apparent to those skilled in the art that any of the illustrated values may be modified depending upon the desired effects.

INDUSTRIAL APPLICABILITY

The present invention is well suited toward regulating the wheel-slip of an articulated machine such as a wheel loader, for example, a wheel loader provided by Caterpillar, Inc. as model no. 966F. It will however, be apparent to those skilled in the art that the present invention is not limited to a wheel loader, as the present invention is well suited to many other types of articulated machines.

As discussed above, the wheel-slip control of the present invention reads the individual wheel speeds, calculates a desired wheel speed ratio and an actual wheel speed ratio. Based on feedback control, an error value is determined. In response to the magnitude of the error value, the control determines the positive or negative braking forces to equalize the torque on the respective wheel set. The brake forces are incrementally modulated with each loop of the control for smooth transitions from the initial braking force to the final braking force.

One advantage of the present invention pertains to the aspect of using PID feedback control. The $V_p$ term of the PID control leads to a proportional gain which provides for a fast response. The $V_i$ term of the PID control cancels any offset in error introduced by the $V_p$ term thus providing for control stability. The $V_a$ term enhances the response characteristics of the control. Thus, the result provides for a wheel-slip control which eliminates wheel-slip quickly and without the undesirable effects of brake "pulsing". Thus, the PID control accurately determines the magnitude and the rate at which the braking force is to be applied.

As shown, the present invention is particularly suited to machines that are articulated and have two sets of axles for driving at least two wheels for each axle set. Moreover, the present invention measures the articulation angle of the machine and adjusts the slip signal value to accommodate for the normal wheel speed differential associated with each axle set during cornering. Consequently, this provides for an adaptive wheel speed control. Further, the anti-spin apparatus independently monitors wheel-slip for each axle set, providing for efficient machine operation.

Other aspects, objects and advantages of the present invention can be obtained from a study of the drawings, the disclosure and the appended claims.

We claim:

1. An anti-spin apparatus for a vehicle, the vehicle having a [horizontal] *vertical* axis, front and rear wheeled sections hinged together by an articulation mechanism for relative movement about the [horizontal] *vertical* axis, and at least one axle set with at least two driven wheels, comprising:

braking means for controllably applying braking forces to each of said driven wheels;

means for producing a slip signal having a value responsive to the difference in rotational velocity between said wheels of said axle set;

means for producing an articulation signal having a value responsive to the angle of articulation of said vehicle;

control means for receiving said slip signal and said articulation signal and producing a braking control signal in response to the magnitudes of the slip and articulation signals; and wherein said braking means receives said braking control signal and [responsibly] *responsively* applies said braking forces to the faster rotating wheel.

2. An anti-spin apparatus, as set forth in claim 1, wherein the value of said slip signal includes:

a value representing the ratio of the faster rotating wheel to the slower rotating wheel; and a value representing the faster rotating wheel.

3. An anti-spin apparatus, as set forth in claim 2, including means for determining a desired speed ratio signal having a value representative of a desired ratio of the faster rotating wheel to the slower rotating wheel in response to the magnitude of the articulation angle signal, the desired ratio having a value representative of substantially no wheel slippage.

4. An anti-spin apparatus, as set forth in claim 3, including means for determining an error value representative of the difference between the values of the slip and desired speed ratio signals.

5. An anti-spin apparatus, as set forth in claim 4, including means for comparing the error value to a first predetermined reference value and applying the braking force in response to the error value being greater than the first predetermined reference value.

6. An anti-spin apparatus, as set forth in claim 5, including means for determining a desired amount of braking force to apply to the faster rotating wheel using Proportional+Integral+Derivative (PID) control, said braking control signal having a magnitude proportional to the desired amount of braking force.

7. An anti-spin apparatus for a vehicle, the vehicle having a [horizontal] *vertical* axis, front and rear wheeled sections hinged together by an articulation mechanism for relative movement about the [horizontal] *vertical* axis, and at least one axle set with at least two driven wheels, comprising:

braking means for controllably applying braking forces to each of said driven wheels;

means for producing a slip signal having a value responsive to the difference in rotational velocity between said wheels of said axle set;

means for producing an articulation signal having a value responsive to the angle of articulation of said vehicle;

control means for receiving said slip signal and said articulation signal, controllably modifying said slip signal in response to the value of said articulation signal, comparing said modified slip signal with a first predetermined reference value, and producing a braking control signal in response to said modified slip signal value exceeding said first predetermined reference value; and wherein said braking means receives said braking control signal and [responsibly] *responsively* applies said braking forces to the faster rotating wheel.

8. An anti-spin apparatus, as set forth in claim 7, wherein the value of said slip signal includes:

a value representing the ratio of the faster rotating wheel to the slower rotating wheel; and a value representing the faster rotating wheel.

9. An anti-spin apparatus, as set forth in claim 8, including means for determining a desired speed ratio signal having a value representative of a desired ratio of the faster rotating wheel to the slower rotating wheel in response to the magnitude of the articulation angle signal, the desired ratio having a value representative of substantially no wheel slippage.

10. An anti-spin apparatus, as set forth in claim 9, including means for modifying said slip signal in response to said desired speed ratio signal, the modified slip signal having a value equal to the difference of said slip signal and desired speed ratio signal.

11. An anti-spin apparatus, as set forth in claim 10, including means for determining a desired amount of braking force to apply to the faster rotating wheel using Proportional+Integral+Derivative (PID) control, said braking control signal having a magnitude proportional to the desired amount of braking force.

12. An anti-spin apparatus, as set forth in claim 7, wherein said vehicle includes at least one additional axle set with at least two driven wheels, said slip signal producing means including respective wheel speed transducers connectable to each of said vehicle wheels and adapted to produce respective signals having values responsive to the rotational velocity of each of said wheels.

13. An anti-spin apparatus, as set forth in claim 12, wherein said slip signal producing means determines the difference in rotational velocity between the wheels of each wheel set.

14. An anti-spin apparatus, as set forth in claim 13, wherein said braking means controllably applies braking forces to the faster rotating wheel of each wheel set.

15. An anti-spin apparatus, as set forth in claim 14, wherein said braking means applies said braking forces which are variably incrementally modulated in proportion to the difference in rotational speeds between the wheels in response to the slip signal.

16. A method for controllably equalizing the torque delivered to an axle set of a vehicle, the vehicle having front and rear wheeled sections being hinged together by an articulation mechanism for relative movement about a [horizontal] *vertical* axis, the axle set having at least two driven wheels where each of the wheels have an associated braking mechanism, comprising the steps of:

producing a slip signal having a value responsive to the difference in rotational velocity between said wheels of said axle set;

producing an articulation signal having a value responsive to the angle of articulation of said vehicle;

receiving said slip signal and said articulation signal and producing a braking control signal in response to the magnitudes of the slip and articulation signals; and receiving said braking control signal and [responsibly] *responsively* operating said braking mechanism.

17. A method, as set forth in claim 16, wherein the step of producing said slip signal includes the steps of:

calculating a value representing a ratio of the faster rotating wheel to the slower rotating wheel; and determining a value that represents the faster rotating wheel.

18. A method, as set forth in claim 17, including the step of determining a desired speed ratio signal having a value representative of a desired ratio of the faster rotating wheel to the slower rotating wheel in response to the magnitude of the articulation angle signal, the desired ratio having a value representative of substantially no wheel slippage.

19. A method, as set forth in claim 18, including the steps of subtracting the desired speed ratio signal from the slip signal and responsively producing an error signal.

20. A method, as set forth in claim 19, including the steps of comparing the error value to a first predetermined reference value and applying the braking force in response to the error value being greater than the first predetermined reference value.

21. A method, as set forth in claim 20, including the steps of determining a desired amount of braking force to apply to the faster rotating wheel using Proportional+Integral+Derivative (PID) control in response to the error signal and producing said braking control signal with a magnitude proportional to the desired amount of braking force.

*22. An anti-spin apparatus for a vehicle, the vehicle having vertical axis, front and rear wheeled sections hinged together by an articulation mechanism for relative movement about the vertical axis, and at least one axle set with at least two driven wheels, comprising:*

*braking means for controllably applying braking forces to each of said driven wheels;*

*a wheel speed transducer associated with each wheel for producing a wheel speed signal having a value responsive to the rotational velocity of the respective wheel of said axle set;*

*means for producing an articulation signal having a value responsive to the angle of articulation of said vehicle;*

*control means for receiving said wheel speed signals and said articulation signal, producing a slip signal in response to the values of said wheel speed and articulation signals, comparing said slip signal with a first predetermined reference value, and producing a braking control signal in response to said slip signal value exceeding said first predetermined reference value; and*

*wherein said braking means receives said braking control signal and responsively applies said braking forces to the slipping wheel.*

*23. An anti-spin apparatus having at least one axle set, as set forth in claim 22, wherein said slip signal represents the difference in rotational velocity between the wheels of each axle set.*

*24. An anti-spin apparatus, as set forth in claim 23, wherein at least one of the at least two driven wheels is an outside wheel and at least one other wheel of the at least two driven wheels is an inside wheel, and the control means modifies the slip signal by reducing the value of the slip signal when the outside wheel is rotating faster than the inside wheel in response to the value of the articulation signal not being equal to zero.*

*25. An anti-spin apparatus, as set forth in claim 23, wherein at least one of the at least two driven wheels is an outside wheel and at least one other wheel of the at least two driven wheels is an inside wheel, and the control means modifies the slip signal by increasing the value of the slip signal when the inside wheel is rotating faster than the outside wheel in response to the value of the articulation signal not being equal to zero.*

*26. An anti-spin apparatus, as set forth in claim 23, wherein the braking means apply the braking forces with variable incremental modulation in proportion to the difference in rotational speeds between the wheels in response to the slip signal.*

*27. An anti-spin apparatus, as set forth in claim 23, wherein the control means compares the slip signal with a plurality of slip reference bands each having defined limits, and producing a braking control signal in response to the slip signal value corresponding to one of the slip reference bands.*

*28. An anti-spin apparatus, as set forth in claim 26, wherein said braking control signal is a pulse-width modulated signal, said braking control signal being modulatable according to the slip reference band to which the slip signal value corresponds.*

*29. An anti-spin apparatus for a vehicle, the vehicle having a vertical axis, front and rear wheeled sections hinged together by an articulation mechanism for relative movement about the vertical axis, and at least one axle set with at least two driven wheels wherein at least one of the driven wheels is a slipping wheel, comprising:*

*braking means for controllably applying braking forces to each of said driven wheels;*

*a wheel speed transducer associated with each wheel for producing a wheel speed signal having a value responsive to the rotational velocity of the respective wheel of said axle set;*

*means for producing an articulation signal having a value responsive to the angle of articulation of said vehicle;*

*control means for receiving said wheel speed signals and said articulation signal and producing a braking control signal in response to the magnitudes of the wheel speed and articulation signals; and*

*wherein said braking means receives said braking control signal and responsively applies said braking forces to the slipping wheel.*

*30. An anti-spin apparatus, as set forth in claim 29, wherein one of the driven wheels is a faster rotating wheel and another one of the driven wheels is a slower rotating wheel and the control means produces an actual speed ratio signal having:*

*a value representing the ratio of the faster rotating wheel to the slower rotating wheel; and*

*a value representing the faster rotating wheel.*

*31. An anti-spin apparatus, as set forth in claim 30, wherein the control means produces a desired speed ratio signal having a value representative of a desired ratio of the faster rotating wheel to the slower rotating wheel in response to the magnitude of the articulation angle signal, the desired ratio having a value representative of substantially no wheel slippage.*

*32. An anti-spin apparatus, as set forth in claim 31, wherein the control means determines an error value representative of the difference between the values of actual and desired speed ratio signals.*

*33. An anti-spin apparatus, as set forth in claim 32, wherein the control means compares the error value to a first predetermined reference value and produces the braking control signal in response to the error value being greater than the first predetermined reference value.*

*34. An anti-spin apparatus, as set forth in claim 33, wherein the control means determines a desired amount of braking force to apply to the slipping wheel using Proportional+Integral+Derivative (PID) control, the braking control signal having a magnitude proportional to the desired amount of braking force.*

*35. A method for controllably equalizing the torque delivered to an axle set of a vehicle, the vehicle having front and rear wheeled sections being hinged together by an articulation mechanism for relative movement about a vertical axis, the axle set having at least two driven wheels where each of the wheels have an associated braking mechanism, comprising the steps of:*

*producing a wheel speed signal having a value responsive to a rotational velocity of each wheel of said axle set;*

*producing an articulation signal having a value responsive to the angle of articulation of said vehicle;*

*receiving said wheel speed signals and said articulation signal and producing a braking control signal in response to the magnitudes of the wheel speed and articulation signals; and*

*receiving said braking control signal and responsively operating said braking mechanism.*

*36. A method, as set forth in claim 35, including the step of producing an actual speed ratio signal having:*

*a value representing a ratio of the faster rotating wheel to the slower rotating wheel; and*

*a value that represents the faster rotating wheel.*

*37. A method, as set forth in claim 36, including the step of producing a desired speed ratio signal having a value representative of a desired ratio of the faster rotating wheel to the slower rotating wheel in response to the magnitude of the articulation angle signal, the desired ratio having a value representative of substantially no wheel slippage.*

*38. A method, as set forth in claim 37, including the steps of subtracting the desired speed ratio signal from the actual speed ratio signal and responsively producing an error signal.*

*39. A method, as set forth in claim 38, including the steps of comparing the error value to a first predetermined reference value and applying the braking force in response to the error value being greater than the first predetermined reference value.*

*40. A method, as set forth in claim 39, wherein at least one of the driven wheels is a slipping wheel and including the steps of determining a desired amount of braking force to apply to the slipping wheel using Proportional+Integral+Derivative (PID) control in response to the error signal and producing the braking control signal with a magnitude proportional to the desired amount of braking force.*

*41. An anti-spin apparatus for a vehicle, the vehicle having a vertical axis, front and rear wheeled sections hinged together by an articulation mechanism for relative movement about the vertical axis, and at least one axle set with at least two driven wheels wherein at least one of the driven wheels is a slipping wheel, comprising:*

*a brake associated with each driven wheel, each brake being capable of controllably applying braking forces to each of the driven wheels;*

*a wheel speed transducer associated with each driven wheel, each wheel speed transducer providing a wheel speed signal having a value responsive to the rotational velocity of the respective wheel of the axle set;*

*an angular position transducer associated with the articulation mechanism, the angular position transducer producing an articulation signal having a value responsive to the angle of articulation of the vehicle;*

*a controller electrically connected to the wheel speed transducer and angular position transducer, the controller adapted to receive the wheel speed signals and the articulation signal and provide a braking control signal to the brake in response to the wheel speed and articulation signals; and*

*wherein the brake receives the braking control signal and responsively applies said braking forces to the slipping wheel.*

*42. An anti-spin apparatus for a vehicle, the vehicle having vertical axis, front and rear wheeled sections hinged together by an articulation mechanism for relative movement about the vertical axis, and at least one axle set with at least two driven wheels, comprising:*

*a brake associated with each driven wheel, each brake being capable of controllably applying braking forces to each of the driven wheels;*

*a wheel speed transducer associated with each driven wheel, each wheel speed transducer providing a wheel speed signal having a value responsive to the rotational velocity of the respective wheel of the axle set;*

*an angular position transducer associated with the articulation mechanism, the angular position transducer producing an articulation signal having a value responsive to the angle of articulation of the vehicle;*

*a controller electrically connected to the wheel speed transducer and angular position transducer, the controller adapted to receive the wheel speed signals and the articulation signal, produce a slip signal in response to the values of the wheel speed and articulation signals, compare the slip signal with a first predetermined reference value, and produce a braking control signal in response to the slip signal value exceeding the first predetermined reference value; and*

*wherein the brake receives the braking control signal and responsively applies the braking forces to the slipping wheel.*

* * * * *